Figure 1:
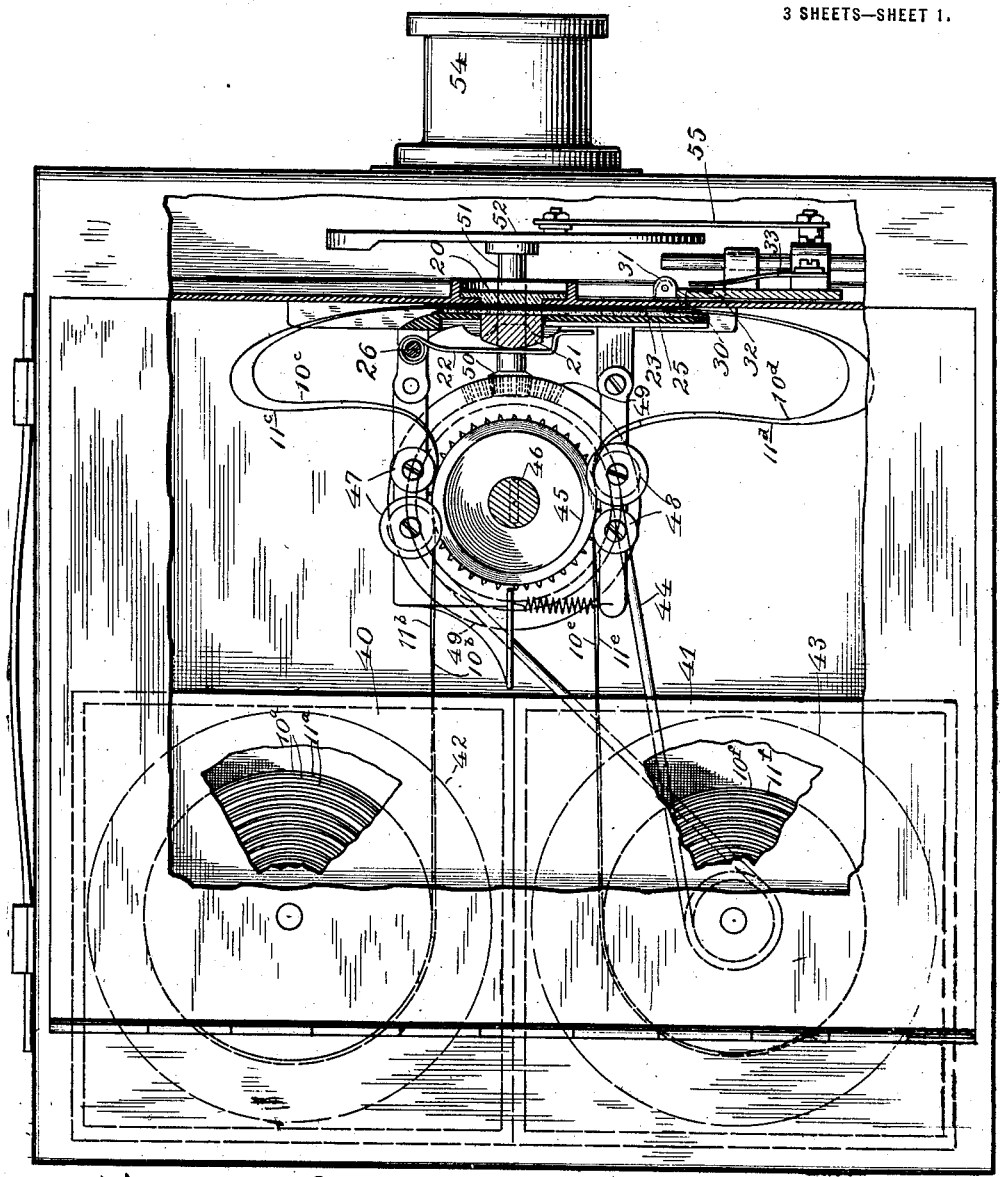

F. E. IVES.
MOTION PICTURE IN COLORS.
APPLICATION FILED MAY 27, 1918.

1,320,760.

Patented Nov. 4, 1919.
3 SHEETS—SHEET 1.

INVENTOR
Frederic E. Ives,
BY
Rogers, Kennedy & Campbell,
ATTORNEYS.

F. E. IVES.
MOTION PICTURE IN COLORS.
APPLICATION FILED MAY 27, 1918.
1,320,760.
Patented Nov. 4, 1919.
3 SHEETS—SHEET 2.
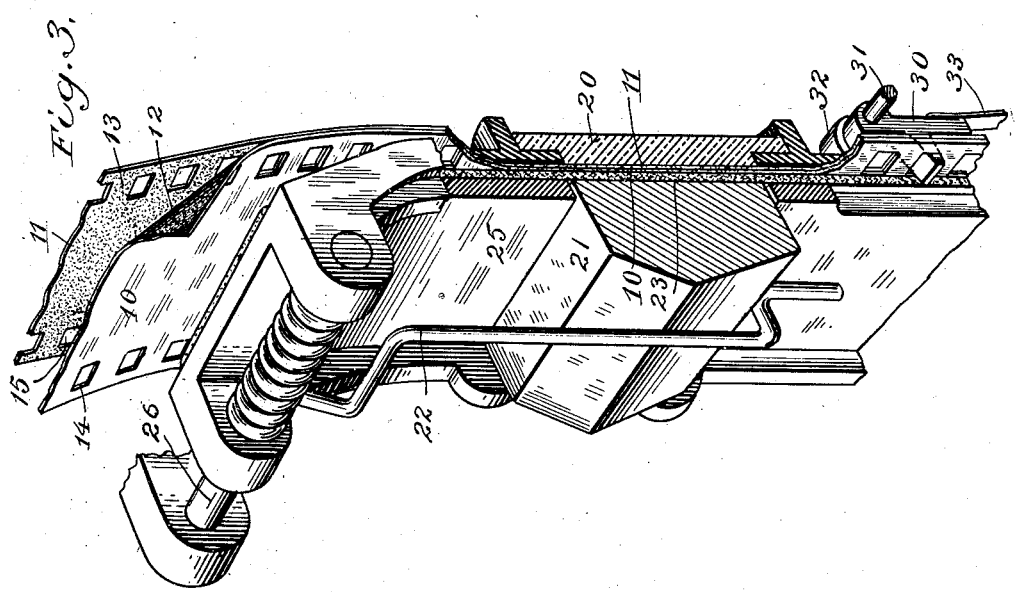
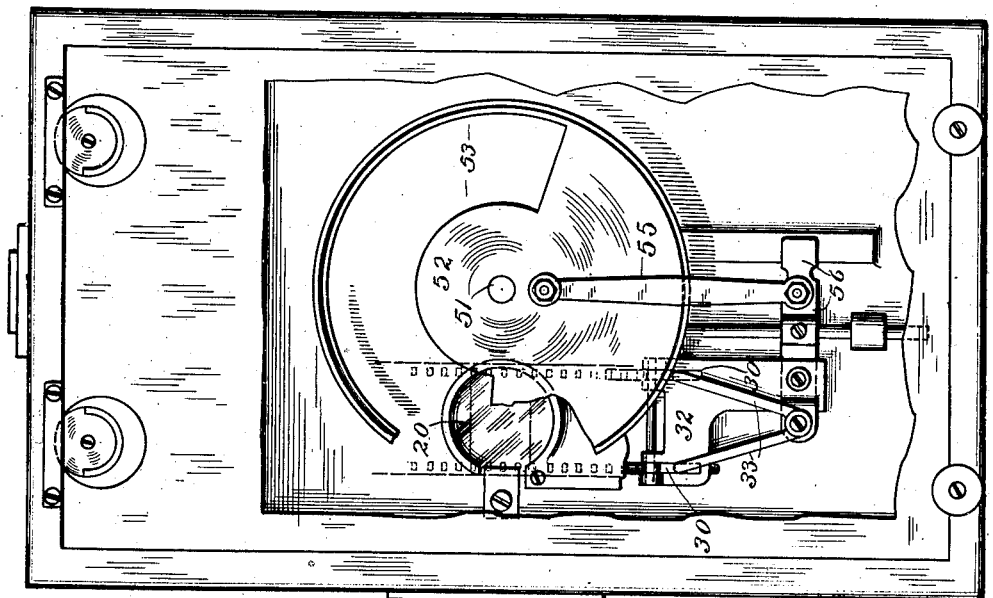
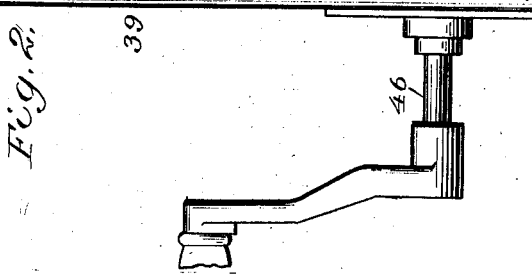
INVENTOR
Frederic E. Ives
BY
Rogers, Kennedy + Campbell
ATTORNEYS.

F. E. IVES.
MOTION PICTURE IN COLORS.
APPLICATION FILED MAY 27, 1918.
1,320,760.
Patented Nov. 4, 1919.
3 SHEETS—SHEET 3.
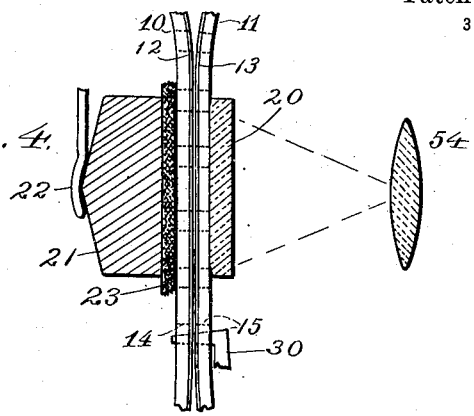
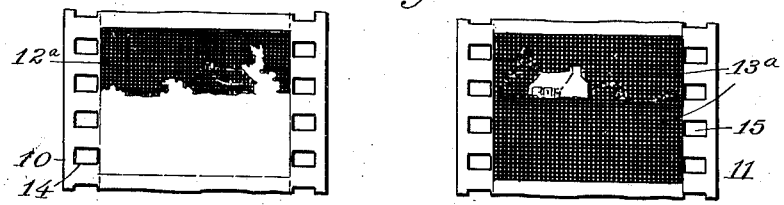
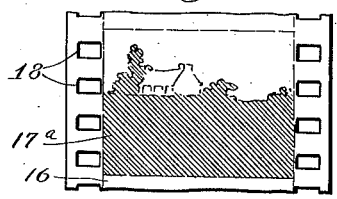
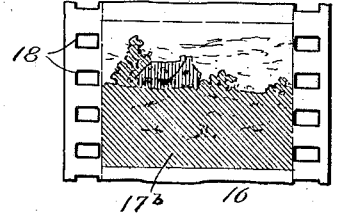
INVENTOR
Frederic E. Ives
BY
Rogers, Kennedy & Campbell
ATTORNEYS.

UNITED STATES PATENT OFFICE.

FREDERIC EUGENE IVES, OF PHILADELPHIA, PENNSYLVANIA.

MOTION-PICTURE IN COLORS.

1,320,760.   Specification of Letters Patent.   Patented Nov. 4, 1919.

Application filed May 27, 1918. Serial No. 236,768.

*To all whom it may concern:*

Be it known that I, FREDERIC EUGENE IVES, a citizen of the United States, residing at Philadelphia, in the county of Philadelphia and State of Pennsylvania, have invented certain new and useful Improvements in Motion-Pictures in Colors, of which the following is a specification, reference being had therein to the accompanying drawing.

This invention relates to motion pictures in color, and more especially to a novel motion picture system, including not only novel method, but novel materials, apparatus and product for the purposes of photographically taking and exhibiting by projection or otherwise motion pictures having the colors, or approximately the colors, of the subject.

The present invention pertains more particularly to the system in which two selected primary colors are employed, exposure being selectively made upon two sensitive films representing the primaries, from which subsequently after development complementarily colored positives are produced and blended for projecting purposes. For the purposes of description I will hereinafter assume the two selected primaries as red and green, although those skilled in the art will understand that this selection may be varied, and that the red or the green may be modified considerably for the special purposes of the subject in hand, or for artistic reasons, or otherwise. For example, an orange-red and a blue-green may be chosen. Hereafter in referring to the primaries or the complementary colors, known as secondaries, these considerations are to be borne in mind.

The general object of the present invention is to afford a color motion picture system of greater simplicity, effectiveness, convenience and commercial practicability than heretofore proposed systems. A particular object is to enable the production of positive or colored picture films capable of being operated and projected by the well known standardized projecting machines which have now been almost universally designed and built on principles and of dimensions to a certain standard, so that the ordinary or black and white picture films are interchangeably used substantially throughout the world. According to this invention each picture or image in the projecting film strip is a complete color picture containing all the requisite colors, and therefore is able to be utilized in the standard projecting machines without requiring special attachments, or special alteration in the speed of travel or intensity of the light; and without flashes or fringes of the two primary colors, as has resulted from heretofore attempted systems. Another feature of the present invention is the simultaneous exposure in a single taking machine or motion picture camera of two sensitive films, which are to record the two primary colors respectively, and a particular object is to enable this to be done substantially on the standard cameras now in commercial use, and, moreover, in such manner as to give image pairs of absolute correctness, and with an exactness of registration which is attained not only in taking the pictures, but in the subsequent printing and projecting steps.

To the attainment of these objects and advantages the present invention consists in the novel methods, steps, materials, apparatus, mechanisms, combinations, devices, products and other features hereinafter illustrated, described or claimed. Other advantages in the present invention will be elucidated in the hereinafter following description of one or more illustrative embodiments of the present invention, or will be understood by those skilled in the subject.

In the accompanying drawings illustrating convenient embodiments of the principles hereof, Figure 1 is a left side elevation of a motion picture camera adapted to use in practising the present invention. Fig. 2 is a front elevation thereof, partly broken away to show certain mechanism. Fig. 3 in perspective shows certain preferred details of structure at the exposing part of the camera. Fig. 4 is a somewhat diagrammatic axial cross-section at the exposing point. Fig. 5 shows in face view the nature of the two negatives produced by exposure as in Fig. 4. Fig. 6 indicates the step of printing the first monochrome positive from one of such negatives. Fig. 7 is a face view of such positive after development. Fig. 8 shows the step of printing the second monochrome positive in registry upon the first, and Fig. 9 indicates the final multi-color positive film ready for projection.

With the present invention the exposure for the two primaries, such as red and green, is characterized as being both simultaneous and co-extensive. By simultaneous I distinguish the present system from those in which the red and green exposures are successive or alternate, as in heretofore suggested systems exemplified in Patent 941,960, of November 30, 1909; which involve the use of an alternating or rotating red and green screen, and necessitate double the usual speed of travel, and increased illumination, besides resulting in the defects known as color flashes or fringes, due to changes of position of the subject between individual exposures. By co-extensive I distinguish the present system from those in which the exposed area is subdivided into a plurality of image spaces, exemplified in prior Patent 1,262,954, of April 16, 1918; which involve either an undesirably reduced image or enlarged film, besides various expedients, such as a plurality of lenses that must exactly match, transparent diagonal reflectors that incur loss of light, and one or another scheme to permit the spacing apart of the lenses, so that each lens may be of ample size for motion picture work.

The referred to characteristics of the present system are herein specifically attained in a manner which will be fully described, and involving the following features, or some of them: Referring first to the camera or taking apparatus, I simultaneously operate two unattached perforated strip films adjacently behind the same image forming lens. These two films are specially sensitized or highly sensitive to the selected primaries, such as red and green. One of them, preferably the green recording film, is to be especially translucent, and to be placed in front of the other. I place the two films face to face, that is, with their sensitive surfaces together, and I cause the advancing travel of both of the films in unison. I prefer for this a suitable step-by-step mechanism having, for example, reciprocating claws or hooks, which rise to engage the perforations and pull the films downwardly the requisite amount. The device should be capable of reaching through and engaging both films, and adapted to aline their perforations. By thus using the same step-by-step mechanism to engage and advance both films simultaneously, and exposing the two simultaneously to each successive light image formed by the objective lens, I secure identical registration of both negative records with respect to the film perforations, and hence accurate registration of the negative images, so that the subsequent steps of printing and blending the positives may be correctly performed by automatic mechanism. During each exposure I apply surface pressure locally, so as to cause intimate surface contact over the image areas of the two films, so that the front or notably translucent film may pass the image through to the other without loss or diffusion. Beyond, both above and below the exposure position, the two unattached films may be arranged loosely or looped freely out of contact with each other, so that the exact registration by the step-by-step mechanism is free from interference by friction or drag. The exposed films may be taken up together on the usual take-up spool, and afterward removed, separated and developed to give two negative strips, each representing one of the two primary colors. Finally, from these negatives I print and blend the appropriate colored positive images upon the exhibiting strip film. The positive strip should be perforated identically with the two negative strips, and I register it in turn with each of them exactly, so that the final multi-color picture has its component images in exact registry. It is, therefore, such a film as is ready to be used in the ordinary commercial projecting machine, and indeed may be used in sections or as inserts for a longer film containing also black and white positives.

I have by this system accomplished the objects and advantages above referred to, and have overcome the prior mentioned objections to motion pictures in color. I will now describe in detail with the aid of the accompanying drawings the complete system and preferred features thereof, but it will be understood that, as the underlying principles and many other features may be extensively modified, no limitations thereto are intended excepting so far as specified in the claims appended at the foot of this specification.

Referring first to the partly diagrammatic Fig. 4, the rear or red sensitized film 10 is shown as in face contact with the front or green sensitized film 11 during esposure. The contacting sensitive surfaces 12 and 13 may be of gelatin or other colloid, containing silver bromid, and mounted on the usual sort of transparent celluloid carriers of elongated strip form. For convenience I will term the rear or red sensitized film 10 the R film, meaning that it is to record the red elements of the subject, and I will likewise refer to the front film as the G film, although it will be understood that in some cases different selections of the front and rear primaries, respectively, are possible. The R film 10 is perforated in the usual manner at 14, and the G film at 15. Machines are well known for accurately effecting these perforations, and to minimize the danger of the slightest distortion from shrinkage or expansion and consequent lack of registration, the films may be freshly perforated before exposure in the camera. Defects of registration would be highly objectionable in motion pictures, where the small images are immensely magnified upon the curtain, so that slight errors would result in false color effects and red or green fringes or edges to moving or stationary objects. This factor is one of the chief elements in the problem which has been solved by the present system, which throughout provides against the defects mentioned.

The rear sensitive film 10 may be a rapid R film made from an emulsion of a character already known, but this would be wholly unadapted to serve as the front film, since all known emulsions which are highly red-sensitive are both coarse-grained and feebly translucent, while being also objectionably sensitive to green light. On the contrary, the G film 11 may be specially prepared for the purposes hereof in a form extremely thin and fine-grained, while notably translucent or substantially transparent to red light. Such G film, moreover, can be made substantially insensitive to red light, so that, if blue light is excluded, its record is purely green representative. I believe such special G film is a commodity that is new with this invention, especially as a front film combined with a rear R film; and, although the details involved in preparing it are not part of the present invention, I mention that the same may be prepared by procuring a specially fine-grained and notably red-light-translucent or transparent blue-sensitive film, which is a commodity already known and produced commercially for certain special uses, and then imparting to this special film the required green-sensitiveness by treatment with an extremely dilute solution of erythrosin dye and ammonia.

If it is desired to most thoroughly exclude the effect of green light on the R film, a screen may be introduced, for example, in the form of a superficial or body dye of red color for the R film or a superficial red dye coating on the G film facing the R film, and which may be water-soluble so as to subsequently dissolve out; and a yellow screen over the lens may be used to exclude blue light.

During exposure, as indicated in Fig. 4, the face-to-face films, while unattached and generally free and loose, have applied to them a local surface pressure to cause intimate contact over the image areas under exposure. This is effected by a transparent plate 20 in front composed of glass or quartz, and also a pressure block 21 at the rear, firmly but resiliently pressed forward by a spring 22, with preferably a cushion or layer 23 of felt between. It will be understood that the pressure might be relaxed between exposures to facilitate advancing the film, but I deem this unnecessary, since a satisfactory face pressure would be insufficient to impede the film advancing action, especially when it is borne in mind that the sensitive surfaces 12, 13, both face inwardly toward each other, while the exposed or exterior surfaces of the films are highly smooth or polished, and are easily drawn through between the felt and glass.

The elements thus for described are substantially all shown in perspective in Fig. 3, which indicates that the pressure block 21 and felt strip 23 are carried by a swinging gate 25, hinged at 26 in a usual manner, so that the gate may be swung rearward against spring pressure when initially threading the films into place in the camera.

Without the described squeezing pressure insuring perfect contacting throughout the faces of the sensitive surfaces at the place and time of exposure, bad results would ensue from the diffusion which would occur in the light traversing the space, however slight, between the films wherever they are not in pressed contact. The described pressing means operates without interfering with the intermittent pulling motion or the free looping and winding of the films beyond the exposure point, as will be explained.

Referring to the film feeding means, this might be of various types. I prefer a step-by-step feed, of which an efficient embodiment is that employing a reciprocating claw or finger which engages the perforations at the sides of the film and pulls forwardly or downwardly, and then moves reversely or upwardly to reëngage the film. I have herein shown a feed claw 30, pivoted at 31 upon the reciprocating yoke 32 and acted on by light springs 33, which cause the claw to enter the film perforations while permitting it to yield like a pawl as it lifts to reëngage the film at a new point.

The feed claw 30, as herein shown, is of a type which is able to reach through the perforations 15 and 14 of the front and rear films and engage them simultaneously in the pulling motion, the pulling or bottom face of the claw being at right angles to the plane of the films, so that it can exactly register or aline the two films with relation to each other for the purposes previously explained. The described feed device, moreover, is located to engage and operate the films as near as feasible to the exposure point, so as to render more exact the registration at that point, notwithstanding slight distortions due to shrinkage of film, although non-registration would be substantially eliminated by the plan of freshly perforating the films, as previously explained.

Other expedients to insure exact registration may be adopted such as a special sprocket at the exposure point engaging and compelling the film perforations to register accurately with each other adjacent to the optical image at the moment of exposure.

The above described elements are illustrated in Figs. 1 and 2, as well as 3 and 4, and these figures also illustrate a convenient form of camera. I make no claim herein to the type or form of camera, which, indeed, may be of various known types, and it is an advantage of this invention that the well known standardized and light weight cameras now in use may be employed in carrying out the present system, with substantially only the changes heretofore mentioned, including the glass plate 20, opposed by a rear resilient pressing device to insure intimate face contact between the two special films, which are unattached, but superposed during travel, and are driven and registered exactly to each other by the same feeding means.

Within the camera box 39 are indicated upper and lower spool retorts 40 and 41 for the upper and lower spools 42 and 43. The upper spool may be the supply spool and the lower one the take-up spool, which is shown driven by a slip drive or belt 44. A single film control sprocket 45 may be used for both the going and returning portions of the film, this being mounted on a drive shaft 46, which may be rotated exteriorly, for example, by a handle. Coöperating with the control sprocket 45 are upper idlers and lower idlers 48, holding the different film portions in engagement with the sprocket, which, it will be understood, rotates continuously at a speed to harmonize with the rate of travel caused by the step-by-step feed means.

Any suitable shutter may be driven from the drive shaft. For this purpose the wheel 45 is shown as having a toothed flange or rim 49 engaging a pinion 50 on the shutter shaft 51, which extends forwardly to where the shutter 52 is attached in front of the exposing point. The shutter is provided with the usual recess 53 for permitting exposure during the periods when the films are not traveling. In front of the films and shutter is a lens 54.

The feed means may be actuated in any suitable or well known manner, and for convenience I show a simple type of operating connections consisting of a rod 55, pivoted near the center of the shutter and having its lower end connected to a crosshead 56, which carries the yoke 32, before mentioned, and causes it to move up and down carrying with it the described feed claw device 30. The drive shaft 46 may be turned by hand at the usual speed to give the regular number of exposures per second.

Instead of modifying the usual camera by providing for two supply spools or reels, I prefer the single supp'y reel 42 for both the R film and the G film, and, as shown, I wind the two unattached sensitive films upon this reel, face to face, with sufficient looseness to allow for inequalities in length and to insure the separation of the films in their subsequent manipulation. I consider this an important feature of the present system and believe that a reel wound with face to face films of different sensitiveness is a novel article of commerce. It renders the taking of motion pictures in color as simple in all respects as the taking of ordinary black and white motion pictures.

I prefer, however, that the two films shall be threaded and maintained in the special manner shown in the drawings, wherein, beyond the exposing point both above and below the films are loose and free, being looped so as to stand out of contact. For example, the course of the films 10 and 11 may be as follows: On the spool 42 the film portions $10^a$ and $11^a$ are shown in face contact. The portions $10^b$, $11^b$ extend from the spool to the control sprocket 45, which draws them from the spool. Beyond the sprocket are the looped portions $10^c$, $11^c$, and here it will be observed that the G film $11^c$ is longer, and therefore constitutes a larger loop than the R film portion $10^c$, which would be drawn forward or slightly tightened in the act of threading the machine. Again beyond and below the exposing position are the freely looped and separated film portions $10^d$ and $11^d$, the latter or G film being longer by reason of being set back one or more feed perforations when threading the machine. From the control sprocket to the take-up spool 43 the film portions $10^e$ and $11^e$ extend, and they are wound or taken up simultaneously on the spool, which is yieldingly driven for this purpose, the wound film portions $10^f$ and $11^f$ standing unattached, but face to face as in the supply spool.

By this system it will be observed that the two sensitive films are free of any registering or driving attachments beyond, both above and below, the exposure point and feed means, so that the latter is free to accurately feed and relatively register the films without interference. Throughout the entire course of the films they are in face contact, and the two films, therefore, give mutual protection from abrasion or other injury, since only their smooth, polished celluloid back surfaces come in contact with the pressure plates, sprockets, and other mechanism.

After exposure the films on the take-up spool 43 are to be developed by any usual or desired apparatus. This development gives two negative strips of black and white, but representing red and green respectively. Thus, the exposed surface 12 of the R film 10 develops into an R negative $12^a$, while the exposed layer 13 of the G film develops into a G negative 13ª, both shown in Fig. 5. Each of these negatives is reversed with respect to the other, and the two, if assembled face to face, will register exactly as to each successive image and its adjacent film perforations throughout the series.

The positives may be made and blended for exhibiting by printing two separate monochrome films which could be run simultaneously through the projecting machine analogously to the sensitive films through the camera; but this is inferior, and the full embodiment of the present invention calls for a single colored positive film 16, which can be operated exactly like the ordinary black and white film and may comprise, as indicated in Figs. 6, 7, 8 and 9, a sensitized gelatin surface 17 on a celluloid carrier, the latter having the same marginal perforations 18 as appear in the sensitive films. The printing may be performed in any inclosed space or dark box with usual source of light, and preferably I perform two printings in succession, first, from the R negative 12ª, and second from the G negative 13ª, with exact registry of each negative to the positive film and with or without face pressure to give proper contact. The printing apparatus may be actuated and the exposure controlled by a step-by-step travel mechanism, analogous to that in the camera, and not shown except in respect to the pulling claws or fingers 19, 19ª, appearing in Figs. 6 and 8, which in turn register the two negatives with the print member 16. The two negatives having been made in exact registry, as before described, the two positive images will register and blend accurately in the finished print.

Fig. 6 represents the step of printing a series of positive images from the R negative 12ª upon the positive film 16. The result is the positive image 17ª, shown in Fig. 7, which is of course to be colored blue-to-green, the complementary of red. Fig. 8 represents the step of printing upon this monochrome positive 17ª the second image by the G negative 13ª. On account of its reversed character the negative image in this instance is inverted. The resulting image is, of course, to be colored red, and we thus have the complete multi-color image 17ᵇ, shown in Fig. 9. In Figs. 7 and 9 the slanting shade lines indicate green, and the vertical ones red.

The details and the chemistry of the printing and developing steps may be varied at will. If separate monochrome positive films are first made and developed, and then attached to form a single film, the process may be employed which is described in Patent No. 1,248,864, of December 4, 1917. I prefer, however, that the two monochromes shall be formed successively in the same colloid layer, for example, by first forming one color image within the body of the layer and thereafter sensitizing, exposing and by a different process introducing an image of a different color into the body of the same layer in registry with the first image. The details of such print making in themselves do not constitute the present invention, but suitable details are disclosed in my prior Patent No. 1,170,540, of February 8, 1916. The procedure may be to print, as in Fig. 6 from the R negative film into the positive film an ordinary silver bromid image and develop it to black. This first image might be printed through the rear of the positive member, so that it would be at the bottom of the colloid layer, the second image to be printed at the top thereof. I show and describe, however, both images printed from the top, as in Figs. 6 and 8, by inverting the G negative film. The developed first silver image I convert to a blue-green color, for example, by treatment with potassium ferricyanid, washing, and treatment with dilute ferric chlorid. The second image may be printed after the printing of the first image, and perhaps after its conversion to blue-green. One way to produce a second red image is to now sensitize the colloid with potassium bichromate, and then expose it in registry under the G negative, as in Fig. 8, then immerse it in water to remove the free bichromate, and then in a dye such as eosin red, which is absorbed and selectively mordanted, after which the unmordanted dye is washed out in water. Another and quicker way to secure two blended images is in accordance with my copending application 195,507, filed October 9, 1917, wherein the G negative is used for printing, giving on development a silver image, which is toned to a satisfactory red color by the copper-toning process; and the second or blue-green image is added by sensitizing and printing according to the iron process so as to form in the same colloid layer a cyanotype image blending with the previously formed red image. We now have a selective red image blended with a blue-green image, and the two-color positive film when dried is ready for projecting purposes.

The color motion pictures may be exhibited by projecting on a curtain by exactly the same apparatus that is used for black and white pictures. The various possible mixtures and proportions of the two secondary colors give an immense variety of tones in the projected pictures. If desired, the veracity of coloring might be enhanced by employing as secondaries magenta and peacock, and projecting the same by a mixture of red and green light, for example, by uniformly dyeing the film with a yellow tint or by a yellow screen in the lantern. I prefer, however, the increased illumination from using the usual strong, white light, the color effect being sufficiently satisfactory for all ordinary purposes.

In describing the films 10 and 11 as unattached, I mean they are only loosely assembled, and are face free and able to be simultaneously registered by the perforation engaging claw of the feed mechanism, and are readily separable for developing, and not cemented together or bound at the edges, and preferably wholly unconnected and so capable of the particular operations illustrated.

It will thus be seen that I have described a system, method, materials, apparatus and product in accordance with the principles and embodying the features of the present invention, the specific disclosures, however, being subject to various modifications within the scope of the invention.

What is claimed is:

1. The method of taking color-motion-pictures to yield two complementary negative strip films from which series of positive images may be produced and blended for exhibiting the pictures in color and motion, comprising advancing directly behind the lens and with their sensitized surfaces facing toward each other two unattached complementarily sensitized identically perforated traveling film strips, while maintaining the image spaces at the exposure point in exact mutual registration with each other and the film perforations, and producing local intimate face contact of the sensitized surfaces of the two strips by a resilient squeezing pressure at the rear thereof against a rigid transparent plate located behind the lens and through which the light passes to simultaneously and coextensively expose complementary images on the two strips respectively.

2. The method as in claim 1 and wherein the front one of the two face contacting film strips bears an emulsion notably translucent to the color which the rear strip is to record.

3. The method as in claim 1 and wherein the front one of the two face contacting film strips bears an emulsion notably translucent to the color which the rear strip is to record, and one of the sensitive films bears a surface screen to exclude other actinic colors from the rear strip.

4. The method as in claim 1 and wherein the front film strip is sensitized to green light and notably fine grained and translucent to red, and the rear strip is sensitized to red.

5. The method as in claim 1 and wherein the unattached film strips are maintained mutually free and loose beyond the exposure point.

In testimony whereof, I have affixed my signature hereto.

FREDERIC EUGENE IVES.